United States Patent Office 2,771,470
Patented Nov. 20, 1956

---

2,771,470

POLYHALO-2,3-EPOXY-BICYCLO (2.2.1) HEPTANES

Victor Mark, Evanston, Ill., assignor to Universal Oil Products Company, Des Plaines, Ill., a corporation of Delaware No Drawing. Application June 16, 1954,
Serial No. 437,281

20 Claims. (Cl. 260—327)

This invention relates to saturated bicyclic organic compounds containing various substituents on the nuclear structure, said compounds being useful as chemical intermediates and as the toxicant ingredient of insecticidal compositions.

More specifically this invention relates to bicyclic organic compounds formed by a process which involves the condensation of a cyclic alkadiene with a substituted aliphatic olefin, followed by the epoxidation of the olefinic linkage remaining after the aforementioned condensation.

This invention provides a series of compositions characterized generally as bicyclic compounds which may be substituted on multiple nuclear positions by halogen, alkyl, nitro, cyano, nitroso, thiocyano, epoxy, epithia, etc. radicals, and which may also contain halogens or other substituents on aliphatic side chains attached to the carbocyclic nucleus comprising the essential structure of the products. These compounds are the products of the Diels-Alder type condensation of a cycloalkadiene with a substituted mono-olefin, said olefin preferably containing fewer than six carbon atoms per molecule, the product of said condensation being subjected to epoxidation or episulfidation for the purpose of saturating said compound.

An object of this invention is to provide substituted saturated bicyclic compounds which are useful as insecticides.

A further object of this invention is to provide saturated bicyclic compounds which may or may not contain nuclearly substituted side chains, said compounds being useful as a means of controlling pestiologically active organisms.

In one embodiment, the present invention concerns a process for the preparation of a saturated bicyclic compound which comprises reacting an unsaturated bicyclic compound with an epoxidizing agent, and recovering the resultant epoxy substituted saturated bicyclic compound, said bicyclic compound having the general formula:

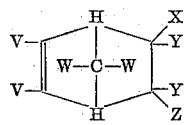

in which V is selected from the group consisting of hydrogen, halogen and alkyl, W and X are independently selected from the group consisting of a halogen and hydrogen, Y is selected from the group consisting of hydrogen, halogen, haloalkyl and alkyl, and Z is selected from the group consisting of nitro, nitroso, cyano and thiocyano.

Another embodiment of this invention resides in a method of controlling pestiologically active organisms by treating said organisms with a compound having the general formula:

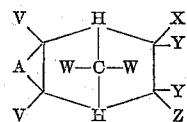

in which A is selected from the group consisting of oxygen and sulfur, V is selected from the group consisting of hydrogen, halogen and alkyl, W and X are selected independently from the group consisting of halogen and hydrogen, Y is selected from the group consisting of halogen, haloalkyl, alkyl and hydrogen, and Z is selected from the group consisting of nitro, nitroso, cyano and thiocyano.

A specific embodiment of this invention resides in a process for preparing a saturated bicyclic compound by reacting 5-nitro-6-trichloromethylbicyclo [2.2.1]-2-heptene with perbenzoic acid, and recovering the resultant 2,3 - epoxy - 5 - nitro - 6 - trichloromethylbicyclo [2.2.1]-heptane.

Another specific embodiment of this invention resides in a method of controlling pestiologically active organisms by treating said organisms with a composition comprising 2,3 - epoxy - 5 - nitro - 6 - trichloromethylbicyclo[2.2.1]-heptane.

Yet another specific embodiment of this invention resides in a new composition of matter comprising 2,3-epoxy - 5 - nitro - 6 - trichloromethylbicyclo[2.2.1]-heptane.

Other objects and embodiments of this invention concerning alternative saturated bicyclic compounds will be referred to in the following further detailed description of the invention.

The compounds of the present invention are prepared by a two-step reaction, the first step comprising reacting a cyclic alkadiene having the formula:

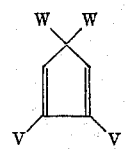

in which V is selected from the group consisting of hydrogen, halogen or alkyl radicals, and W is selected from the group consisting of hydrogen or halogen radicals, with a mono-olefin having the formula:

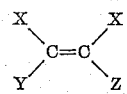

in which X is selected from the group consisting of hydrogen or halogen radicals, Y is selected from the group consisting of hydrogen, alkyl or haloalkyl radicals, and Z is selected from the group consisting of nitro, nitroso, cyano or a thiocyano radical, and oxidizing the resultant compound with an epoxidizing agent to form the desired insecticidal composition.

Examples of cyclic alkadienes having the structure required for yielding the intermediate product of the present invention include cyclopentadiene, alkyl substituted cyclopentadienes such as 1-methylcyclopentadiene, 5-methylcyclopentadiene, 1-ethylcyclopentadiene, 1-propylcyclopentadiene, 5-ethylcyclopentadiene, 5-propylcyclopentadiene, 1,5-dimethylcyclopentadiene, 1,5-diethylcyclopentadiene, 1,5-dipropylcyclopentadiene, etc.; halogen substituted alkadienes such as 1-chlorocyclopentadiene, 1-bromocyclopentadiene, 1-fluorocyclopentadiene, 1,5-dichlorocyclopentadiene, 1,5-dibromocyclopentadiene, 1,5-difluorocyclopentadiene, 3,3-dichlorocyclopentadiene, 3,3-dibromocyclopentadiene, 3,3-difluorocyclopentadiene, 3,3,5-trichlorocyclopentadiene, 3,3,5-tribromocyclopentadiene, 3,3,5-trifluorocyclopentadiene, 1,3,3,5-tetrachlorocyclopentadiene, etc., 1,5-dichloro-3,3-difluorocyclopentadiene, 1-chloro-3,3-difluorocyclopentadiene, etc.

Substituted aliphatic mono-olefins capable of reacting in the present condensation reaction with the cyclopentadiene reactant may be selected from the aliphatic substituted olefins containing a varying number of carbon atoms per molecule. Accordingly, shorter chain length compounds within the above class of compounds are the preferred reactants, although the variations in properties of the condensation product resulting from the use of longer chain olefins may compensate for the usually lower yields accompanying their use. The volatility of the resultant product, for example, is usually dependent upon its molecular weight and when a product having low volatility is especially desired in a particular application, such as a high degree of retentivity on the surface to which the pesticide is applied, advantage may be taken of the fact that the longer chain olefins yield a product having relatively higher boiling points than do the short chain olefins and thus, may be the preferred reactants for the production of such compositions.

The preferred olefins including substituted olefins, utilizable in the present condensation process, on the basis of yield of product obtained therefrom and relative ease of preparation are substituted ethylenes such as vinyl chloride, vinyl bromide, vinyl fluoride, 1,2-dichloroethylene, 1,2-dibromoethylene, 1,2-difluoroethylene, 1,1,2-trichloroethylene, 1,1,2-tribromoethylene, 1,1,2-trifluoroethylene, 1-chloro-1-nitroethylene, 1-chloro-1-cyanoethylene, 1-chloro-1-nitrosoethylene, 1-fluoro-1-thiocyanoethylene, 1-bromo-1-nitroethylene, 1-fluoro-1-nitroethylene, etc., 2-chloro-1-nitro-1-propene, 3-chloro-1-thiocyano-1-propene, 2,3-dichloro-1-thiocyano-1-propene, 2,3-dibromo-1-thiocyano-1-propene, 2,3-difluoro-1-thiocyano-1-propene, 3,3-dichloro-1-thiocyano-1-propene, 3,3-dibromo-1-thiocyano-1-propene, 3,3-difluoro-1-thiocyano-1-propene, 3,3,3-trichloro-1-nitroso-1-propene, 3,3,3-dibromo-1-nitroso-1-propene, 3,3,3-trifluoro-1-nitroso-1-propene, 3-chloro-1-nitro-1-propene, 3-chloro-1-cyano-1-propene, 3-chloro-1-nitroso-1-propene, 3-bromo-1-cyano-1-propene, 3-chloro-1-thiocyano-1-propene, 3-fluoro-1-cyano-1-propene, 3,3-dichloro - 1 - nitro-1-propene, 3,3,3-trichloro-1-nitro-1-propene, 3,3,3-tribromo-1-nitro-1-propene, 3,3,3-trifluoro-1-nitro-1-propene, 3,3-dichloro-1-nitroso-1-propene, 3,3-dichloro - 1 - thiocyano-1-propene, 3,3-dichloro-1-cyano-1-propene, 3,3-dichloro-3-fluoro-1-nitro-1-propene, 1,1,2-trichloro-3,3,3-trifluoro-1-propene, 3,3-dichloro-3-bromo-1-nitro-1-propene, 1,1,2-tribromo-3,3,3-trifluoro-1-nitro-1-propene, etc., 1,4-dichloro-1-nitro-butene, 1,2,3,4-tetrachloro-1-thiocyano-1-butene, 1,3,3-trichloro-1-thiocyano-1-butene, 1,4-dibromo-1-thiocyano-1-butene, 1,2,3,4-tetrabromo-1-thiocyano-1-butene, 1,4,4-tribromo-1-thiocyano-1-butene, 2,4-difluoro-1-thiocyano-1-butene, 1,2,3,4-tetrafluoro-1-thiocyano-1-butene, 1,4,4-trifluoro-1-thiocyano-1-butene. 4,4,4-trichloro-3-bromo-2-thiocyano - 2 - butene, 4,4,4-trichloro-1-thiocyano-1-butene, 4,4,4-trichloro - 3 - fluoro-1-nitro-1-butene, 4,4,4-trichloro-3-fluoro-1-nitroso-1-butene, 4,4,4-trichloro-3-fluoro-1-cyano-1-butene, 4,4,4-trichloro-3-nitroso-1-butene, 4,4,4-trichloro-3-fluoro-1-cyano-1-butene, 4,4,4 - trichloro-3-fluoro-1-thiocyano-1-butene, 4,4,4-tribromo-3-fluoro-1-thiocyano-1-butene, 4,4,4-tribromo-2-fluoro-1-thiocyano-1-butene, 4,4,4-tribromo-3-fluoro-1-nitro-1-butene, 4,4,4-tribromo-3-fluoro-1-nitroso-1-butene, 4,4,4-tribromo-3-fluoro-1-cyano-1-butene, 4,4,4-tribromo-3-nitroso-1-butene, 4,4,4 - tribromo-3-fluoro-1-cyano-1-butene, 4,4,4-tribromo-3-fluoro-1-thiocyano-1-butene, 4,4,4-trifluoro-3-bromo-1-butene, 4,4,4-trifluoro-1-butene, 4,4,4-trifluoro-3-bromo-1-nitro-1-butene, 4,4,4-trifluoro-3-bromo-1-nitroso-1-butene, 4,4,4-trifluoro-3-chloro-1-cyano-1-butene, 4,4,4-trifluoro-3-nitroso - 2 - butene, 4,4,4-trifluoro-3-bromo-1-cyano-1-butene, 4,4,4 - trifluoro-3-bromo-1-thiocyano-1-butene, 3,4,4-trichloro-3-bromo-1-pentene, 3,4,4-trichloro-1-pentene, 3,4,4-trichloro-3-fluoro-1-nitro-1-pentene, 3,4,4-trichloro-3-fluoro-1-nitroso-1-pentene, 4,4,5-trichloro-3-fluoro-1-cyano-1-pentene, 4,4,5-trichloro-3-fluoro-1-cyano-1-pentene, 4,4,5-trichloro-3-fluoro-1-thiocyano-1-pentene, 4,4,5-trichloro-3-fluoro-1-thiocyano-1-pentene, 4,4,5-tribromo-3-bromo-1-pentene, 4,4,5-tribromo-1-pentene, 4,4,5-tribromo-3-fluoro-1-nitro-1-pentene, 4,4,5-tribromo-3-fluoro-1-nitroso-1-pentene, 4,4,5-tribromo-3-fluoro-1-cyano-1-pentene, 4,4,5-tribromo-3-nitroso-1-pentene, 4,4,5-trichloro-3-fluoro-1-cyano-1-pentene, 4,4,5-tribromo-3-fluoro-1-thiocyano-1-pentene, 4,4,5-trifluoro-3-bromo-1-pentene, 4,4,5-trifluoro-1-pentene, 4,4,5-trifluoro-3-bromo-1-nitro-1-pentene, 4,4,5-trifluoro-3-bromo-1-nitroso-1-pentene, 4,4,5-trifluoro-3-bromo-1-cyano-1-pentene, 4,4,5-trifluoro-2-nitroso-1-pentene, 4,4,5-trifluoro-3-bromo-2-cyano-1-pentene, 4,4,5-trifluoro-3-bromo-2-thiocyano-1-pentene, etc. It is to be understood that the above enumerated cycloalkadienes and substituted aliphatic mono-olefins are only representatives of the classes of compounds which may be used in the process of the present invention, and that said process is not necessarily limited thereto.

The process for the preparation of the bicyclic nuclearly substituted compound is effected by the thermal condensation of the cyclic alkadiene with the substituted olefin, preferably at a pressure sufficient to maintain at least one of the reactants in substantially liquid phase. Although the use of approximately equimolecular ratios of the reactants generally results in a substantial yield of the desired condensation product, it is usually preferred to maintain a stoichiometric excess of the aliphatic olefin component in the reaction mixture of from about 1.5 to 1 to about 10 to 1 molecular proportions of the aliphatic olefin to the cyclic alkadiene reactant in order to consume the latter component substantially to completion during the reaction. In addition, the excess of aliphatic olefin reactant provides an effective diluent of the reaction mixture enabling the rate of the resultant exothermic reaction to be controlled within desirable limits. In thus substantially removing the cyclic alkadiene component from the reaction mixture by virtue of its substantially complete condensation with the aliphatic olefin reactant, the subsequent problem of separating the product from the reaction mixture is simplified, since the excess of aliphatic olefin, usually the component of the reaction mixture having the lowest boiling point, may be removed therefrom merely by distilling the same from the mixture, leaving an insecticide consisting primarily of the desired condensation product. The latter residue may be thereafter purified, for example, by fractional distillation, crystallization, extraction or by other means well known in the art, or utilized directly without further treatment for the preparation of an insecticidal composition therefrom. The product may be additionally treated, for example, by reaction with a metal to effect dehalogenation or with an alkaline material to effect dehydrohalogenation. In addition, the compounds may also be halogenated if so desired to introduce additional halogen substituents into the structure.

The first step of the condensation reaction provided herein, generally characterized as one of the Diels-Alder type, is effected at a temperature of from about 30° to about 180° C. or higher, preferably at a temperature of from about 50° C. to about 150° C. Use of superatmospheric pressures, generally in excess of about 2 atmospheres and preferably from about 10 to about 100 atmospheres may be of advantage to maintain substantially liquid phase conditions. In order to provide such pressure within the reaction vessel a suitable inert gas such as nitrogen, carbon dioxide, etc. may be charged into the reaction vessel at the desired pressure and the reaction mixture heated at such pressure until the optimum degree of condensation has occurred.

The unsaturated bicyclic compound, produced in the present process, having the general formula:

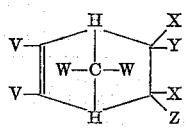

examples of which include, 5-nitro-6-trichloromethylbicyclo[2.2.1] - 2 - heptene, 5 - cyano - 6 - trichloromethylbicyclo [2.2.1]-2-heptene, 5-nitro-6-α,α,β-trichloropropylbicyclo [2.2.1]-2-heptene, 5,5,6 - trichloro - 6 - trifluoromethylbicyclo[2.2.1] - 2 - heptene, 5 - thiocyano - 6- trichloromethyl - bicyclo[2.2.1] - 2 - heptene, 5 - nitro-6-trifluoromethylbicyclo[2.2.1]-2-heptene, etc., is then subjected to the action of an epoxidizing agent to form the desired pestiologically active compositions.

The epoxidation of the unsaturated bicyclic compound occurs at temperatures of 35° C. or below in the presence of an inert organic solvent such as chloroform, carbon tetrachloride, methanol, etc. Due to the fact that the reaction may be exothermic by nature, the temperature of said reaction is desirably maintained below the above-mentioned maximum, although in the case of the less reactive compounds within the class provided herein such as certain highly substituted compounds the reaction temperature may be increased somewhat above the indicated preferred maximum in order to promote the rate of reaction. The preferred epoxidizing agent utilizable in this reaction comprises organic peracids such as perbenzoic acid, peracetic acid, monoperphthalic acid, performic acid, etc. Inorganic oxidizing agents such as nitric acid, potassium permanganate, potassium dichromate, etc. may also be used, although not necessarily with equivalent results. An alternative method of preparing these epoxy compounds comprises addition of hypochlorous acid to the double bond, and subsequent dehydrochlorivation of the resulting chlorohydrin.

The epoxidation of the unsaturated bicyclic compounds results in a new composition of matter comprising a saturated epoxy compound such as 2,3-epoxy-5-nitro-6-trichloromethylbicyclo[2.2.1] - heptane, 2,3 - epoxy - 5- cyano - 6 - trichloromethylbicyclo[2.2.1] - heptane, 2,3- epoxy - 5 - nitro - 6 - α,α,β - trichloropropylbicyclo[2.2.1]- heptane, 2,3 - epoxy - 5,5,6 - trichloro - 6 - trifluoromethylbicyclo[2.2.1] - heptane, 2,3 - epoxy - 5 - thiocyano - 6 - trichloromethylbicyclo[2.2.1] - heptane, 2,3- epoxy - 5 - nitro - 6 - trifluoromethylbicyclo[2.2.1]- heptane, etc. constituting the desired end-product of the present process to which the invention is directed.

If so desired the epoxy-substituted bicyclic compounds may undergo further reaction with a sulfur containing compound to convert said epoxy-substituted compounds to epithia-substituted compounds. For example, the aforementioned epoxy compounds can be reacted with potassium thiocyanate or other sulfur compounds such as mercaptans, to produce the corresponding thia analog of the epoxy-substituted product, such as, for example, 2,3 - epithia - 5 - nitro - 6 - trichloromethylbicyclo[2.2.1]- heptane, 2,3 - epithia - 5 - cyano - 6 - trichloromethylbicyclo[2.2.1] - heptane, 2,3 - epithia - 5 - nitro - 6 - α,α,β-trichloropropylbicyclo[2.2.1]-heptane, etc.

The physical properties of the present bicyclic condensation products and the effects they have on entomological forms of life make them particularly desirable as insecticides and insect repellants, the compounds having many of the properties desired of materials for this purpose. They are, for example, toxic to insects which are destructive of plant life and property normally subject to insect infestation, their toxic effects being manifested by contact of the poison with the insect. The insecticides comprising the present compounds are thus effective against chewing as well as sucking types of insects. The compounds are sufficiently volatile such that when applied to plant life intended for subsequent human consumption, the plant when harvested and after allowing a reasonable time for evaporization of the applied insecticide therefrom retains none of the toxicant to prevent use of the plant for food purposes. On the other hand, the compounds are of sufficiently limited volatility to be retained for the time required to accomplish the toxic effects of the compounds. The volatility and retentive capacity of the compounds may be varied at will by combining them with suitable fixing agents which reduce or promote their volatilization, as desired. Thus, the compounds may be dissolved in a suitable high boiling solvent, such as a mineral or vegetable oil, etc.; a wax, such as paraffin wax, beeswax, etc.; a high molecular weight alcohol or ether such as myricyl alcohol, dibutyl ether, etc.; or they may be emulsified with water or combined with an oil and emulsified with water by the addition of an emulsifying agent, such as a surface active agent, to the mixture of components. The latter solvents and dispersants may also be employed for the specific purpose of reducing the concentration of insecticide to the desired level in a specific insecticidal formulation. The particular formulation of active components in combination with the solvent or dispersant will depend upon its application. Compositions containing as high as 20% of active component may be preferred in some instances where deep penetration of the insecticide is desired, as in the treatment of fibrous material such as wood, for extinction of a particular infestation, such as wood termites. For other purposes, the required concentration of active components in the formulation may be as low as 0.1%, as for example in the treatment of fabrics for destroying moth larvae. In utilizing the present insecticidal compounds against most insects, a composition containing from about 0.1% to about 5% by weight of the active component is highly effective. The choice of the most desirable solvent or dispersant further depends upon the method utilized to apply the insecticidal composition to the infested article. For example, a low molecular weight, normally gaseous carrying agent for the active insecticidal component, such as butane, the Freons, etc. may be compressed and liquefied into a small bomb containing the insecticide. Upon release of pressure from the bomb, the liquefied carrier vaporizes and suspends a quantity of the active component therein, thus providing a convenient spraying method of applying the insecticide. The active component may also be dissolved in a liquid carrier such as kerosene, and alcohol, etc., and the resulting solution atomized by a suitable spraying device.

The process of the present invention may be effected in any suitable manner and may comprise either a batch or continuous type operation. When a batch type operation is employed, the reactants comprising the cyclic alkadiene and the substituted aliphatic olefin are placed in an appropriate condensation apparatus containing mixing and heating means. The reaction vessel is heated to the desired temperature and maintained at such temperature for a predetermined period of time, generally for a period in excess of 0.5 hours and up to about 24 hours. At the end of this time the reaction vessel and contents thereof are cooled to room temperature and the products separated by conventional means, such as fractional distillation, crystallization, etc. The unsaturated bicyclic compounds may then be returned to the same reaction vessel or a second vessel along with an epoxidizing agent such as perbenzoic acid. The reaction vessel is then maintained at the desired low temperature for a second predetermined period of time ranging from about 3 to about 100 hours. At the end of this time, the epoxy-substituted saturated bicyclic compound is again separated from unreacted starting material by the washing with mild alkali, then with water, drying and recrystallization or fractional distillation. If the thia-substituted analog is desired as the ultimate product, the epoxy derivative, formed as hereinabove indicated is thereafter reacted with a sulfur containing compound such as potassium thiocyanate, in still a third reaction vessel for the necessary time, and thereafter separated from the unreacted epoxy compound by suitable means, for example, by fractional distillation, crystallization, etc.

Another method of preparation comprises the continuous type of operation. In this method the reactants are continually charged to a reaction vessel maintained at the proper operating conditions of temperature and pressure while the reaction product is continuously withdrawn after the desired residence time in the reaction. This reaction product comprising the unsaturated bicyclic compound is then charged to a second reactor and subjected to the action of an epoxidizing agent at reduced temperatures. The epoxy-substituted compound is withdrawn from the second reactor after a suitable period of residence time and purified, while the unreacted material may be recycled for further use as a portion of the feed stock.

The present invention is further illustrated with respect to specific embodiments therein in the following examples which, however, are not intended to limit the generally broad scope of the present invention in strict accordance therewith.

*Example I*

254 g. of 3,3,3-trichloro-1-nitro-1-propene were charged to a 3-necked flask provided with stirring means, thermometer, dropping funnel and a Dry-Ice condenser. 50 g. of freshly distilled cyclopentadiene were added dropwise to the nitro-olefin accompanied by continuous stirring. After completing the addition of the cyclopentadiene, the reaction mixture was heated for approximately 20 minutes at 50° C. At the end of this time, the reaction mixture was distilled in an appropriate apparatus under reduced pressure. A cut boiling in the range of 97° to 99° C. at 0.25 mm. pressure was separated and recrystallized twice from pentane.

5.1 g. of this product comprising 5-nitro-6-trichloromethylbicyclo[2.2.1]-2-heptene was reacted with 54 ml. of a chloroform solution containing perbenzoic acid. The epoxidation was carried out at room temperature for a period of approximately 72 hours. At the end of this time, the chloroform solution was washed twice with dilute potassium carbonate solution (in order to remove the benzoic acid), twice with water, and dried over calcium chloride. The calcium chloride was filtered off from the chloroform solution which was evaporated on a steam bath. The residue comprising exo-2,3-epoxy-5-nitro-6-trichloromethylbicyclo[2.2.1]-heptane having a melting point of 88.9° C. was recrystallized from methyl alcohol.

*Example II*

6.5 g. of trans-5,6-dichlorobicyclo[2.2.1]-2-heptene and 108 ml. of a chloroform solution containing perbenzoic acid were allowed to react in a manner similar to that described in Example I. At the end of this time, the chloroform solution was subjected to the same steps hereinbefore described, namely, washing with dilute potassium carbonate, water washing, drying over calcium chloride, filtration, evaporation and recrystallization. The residue had a melting point of 72° C. and comprised 2,3-epoxy-trans-5,6-dichlorobicyclo[2.2.1]-heptane.

*Example III*

The product obtained from the reaction described in Example I, namely exo-2,3-epoxy-5-nitro-6-trichloromethylbicyclo[2.2.1]-heptane is reacted with potassium thiocyanate and the product therefrom, comprising 2,3-epithia-5-nitro-6-trichloromethylbicyclo[2.2.1]-heptane is separated from unreacted materials. It is water washed and may then be used without recrystallization.

*Example IV*

The exo- and endo-forms of 2,3-epoxy-5-nitro-6-trichloromethylbicyclo[2.2.1]-heptane were tested to show the insecticidal properties thereof. The results of these tests using house flies, pea aphids and mites as test insects are set forth in Table I below.

TABLE I

| | Houseflies, percent dead, 24 hrs. | | Pea Aphids, percent dead, 24 hrs. | | Mites, percent dead, 24 hrs. | |
|---|---|---|---|---|---|---|
| | 1% dil. | 0.1% dil. | 1% dil. | 0.1% dil. | 1% dil. | 0.1% dil. |
| Exo-2, 3-epoxy-5-nitro-6-trichloromethylbicyclo [2.2.1]-heptane | 100 | 100 | 90 | 10 | 90 | 50 |
| Endo-2, 3-epoxy-5-nitro-6-trichlorobicyclo [2.2.1]-heptane | 100 | 56 | 100 | 0 | 42 | 25 |

I claim as my invention:

1. A process for the preparation of a saturated bicyclic compound which comprises reacting an unsaturated bicyclic compound with an epoxidizing agent, and recovering the resultant epoxy-substituted saturated bicyclic compound, said unsaturated bicyclic compound having the general formula:

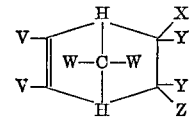

in which V is selected from the group consisting of hydrogen, alkyl and halogen radicals, W and X are selected independently from the group consisting of halogen and hydrogen radicals, Y is selected from the group consisting of halogen, haloalkyl, alkyl and hydrogen radicals, and Z is selected from the group consisting of nitro, nitroso, cyano and thiocyano radicals.

2. A process as set forth in claim 1 in which said epoxidizing agent is a perbenzoic acid.

3. A process as set forth in claim 1 in which said epoxidizing agent is peracetic acid.

4. A process as set forth in claim 1 which comprises reacting said unsaturated bicyclic compound with an epoxidizing agent and thereafter reacting the resultant epoxy-substituted saturated bicyclic compound with a sulfur-containing compound to form an epithia substituted saturated bicyclic compound.

5. A process as set forth in claim 1, which comprises reacting said unsaturated bicyclic compound with an epoxidizing agent and thereafter reacting the resultant epoxy-substituted saturated bicyclic compound with an alkali metal thiocyanate to form an epithia substituted saturated bicyclic compound.

6. A process as set forth in claim 1 which comprises reacting 5-nitro-6-trichloromethylbicyclo[2.2.1] - 2 - heptene with perbenzoic acid, and recovering the resultant 2,3-epoxy-5-nitro-6 - trichloromethylbicyclo[2.2.1] - heptane.

7. A process as set forth in claim 1 which comprises reacting 5-cyano-6-trichloromethylbicyclo[2.2.1]-2 - heptene with perbenzoic acid and recovering the resultant 2,3-epoxy-5-cyano-6-trichloromethylbicyclo[2.2.1] - heptane.

8. A process as set forth in claim 1 which comprises reacting 5,5,6-trichloro-6-trifluoromethylbicyclo[2.2.1]-2-heptene with perbenzoic acid, and recovering the resultant 2,3-epoxy-5,5,6 - trichloro - 6 - trifluoromethylbicyclo-[2.2.1]-heptane.

9. A process as set forth in claim 1 which comprises reacting 5 - nitro-6-α,α,β-trichloropropylbicyclo[2.2.1]-2-heptene with perbenzoic acid, and recovering the resultant 2,3 - epoxy-5-nitro-6-α,α,β-trichloropropylbicyclo[2.2.1]-heptane.

10. A compound having the general formula:

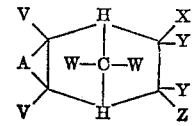

in which A is selected from the group consisting of oxygen and sulfur radicals, V is selected from the group consisting of hydrogen, alkyl and halogen radicals, W and X are selected independently from the group consisting of halogen and hydrogen radicals, Y is selected from the group consisting of halogen, haloalkyl, alkyl and hydrogen radicals, and Z is selected from the group consisting of nitro, nitroso, cyano and thiocyano radicals.

11. The compound 2,3-epoxy-5-nitro-6-trichloromethylbicyclo[2.2.1]-heptane.

12. The compound 2,3 - epoxy - 5 - cyano-6-trichloromethylbicyclo[2.2.1]-heptane.

13. The compound 2,3-epoxy-5,5,6-trichloro-6-trifluoromethylbicyclo[2.2.1]-heptane.

14. The compound 2,3-epoxy-5-nitro-6-$\alpha,\alpha,\beta$-trichloropropylbicyclo[2.2.1]-heptane.

15. The compound 2,3 - epithia - 5 - nitro-6-trichloromethylbicyclo[2.2.1]-heptane.

16. A new insecticidal composition comprising 2,3-epoxy - 5 - nitro - 6 - trichloromethylbicyclo[2.2.1]-heptane and a liquid carrier therefor.

17. A new insecticidal composition comprising 2,3-epoxy - 5 - cyano - 6 - trichloromethylbicyclo[2.2.1]-heptane and a liquid carrier therefor.

18. A new insecticidal composition comprising 2,3-epoxy - 5,5,6 - trichloro - 6 - trifluoromethylbicyclo[2.2.1]-heptane and a liquid carrier therefor.

19. A new insecticidal composition comprising 2,3-epoxy - 5 - nitro - 6 - $\alpha,\alpha,\beta$-trichloropropylbicyclo[2.2.1]-heptane and a liquid carrier therefor.

20. A new insecticidal composition comprising 2,3-epithia - 5 - nitro - 6 - trichloromethylbicyclo[2.2.1]-heptane and a liquid carrier therefor.

References Cited in the file of this patent

UNITED STATES PATENTS

| | | |
|---|---|---|
| 2,583,569 | Herzfeld | Jan. 29, 1952 |
| 2,655,514 | Kleiman | Oct. 13, 1953 |
| 2,676,131 | Soloway | Apr. 20, 1954 |

OTHER REFERENCES

Nyman: Berichte 72B:16–18 (1939), (C. A. 33:2129[8]).